(12) United States Patent
Zeng et al.

(10) Patent No.: US 12,276,613 B2
(45) Date of Patent: Apr. 15, 2025

(54) MULTIPULSE-INDUCED SPECTROSCOPY METHOD AND DEVICE BASED ON FEMTOSECOND PLASMA GRATING

(71) Applicants: Chongqing Institute of East China Normal University, Chongqing (CN); East China Normal University, Shanghai (CN); Yunnan Huapu Quantum Material Co., Ltd, Yunnan (CN); ROI Optoelectronics Technology CO, LTD., Shanghai (CN); Chongqing Huapu Scientific Instrument Co., Ltd., Chongqing (CN); Chongqing Huapu Intelligent Equipment Co., Ltd., Chongqing (CN); GuangDong ROI Optoelectronics Technology Co., Ltd., Guangdong (CN)

(72) Inventors: Heping Zeng, Chongqing (CN); Mengyun Hu, Chongqing (CN)

(73) Assignees: Chongqing Institute of East China Normal University, Chongqing (CN); East China Normal University, Shanghai (CN); Yunnan Huapu Quantum Material Co., Ltd, Kunming (CN); ROI Optoelectronics Technology CO, LTD., Shanghai (CN); Chongqing Huapu Scientific Instrument Co., Ltd., Chongqing (CN); Chongqing Huapu Intelligent Equipment Co., Ltd., Chongqing (CN); GuangDong ROI Optoelectronics Technology Co., Ltd., Dongguan (CN)

( * ) Notice: Subject to any disclaimer, the term of this patent is extended or adjusted under 35 U.S.C. 154(b) by 207 days.

(21) Appl. No.: 17/936,923

(22) Filed: Sep. 30, 2022

(65) Prior Publication Data
US 2023/0093899 A1    Mar. 30, 2023

(30) Foreign Application Priority Data

Sep. 30, 2021   (CN) .......................... 202111159827.3

(51) Int. Cl.
*G01N 21/71* (2006.01)
*G01J 3/18* (2006.01)
*G02B 27/10* (2006.01)

(52) U.S. Cl.
CPC .......... *G01N 21/718* (2013.01); *G01J 3/1809* (2013.01); *G02B 27/1006* (2013.01)

(58) Field of Classification Search
CPC ...... G01N 21/718; G01N 21/71; G01N 21/01; G01J 3/1809; G01J 3/443; G02B 27/1006
See application file for complete search history.

(56) References Cited

U.S. PATENT DOCUMENTS 6,008,897 A  * 12/1999 Sabsabi ................ G01N 21/718
                                                                356/318
11,085,882 B1 * 8/2021 Bol'shakov ........... H01J 49/105
(Continued)

FOREIGN PATENT DOCUMENTS

| CN | 109884034 A |   | 6/2019 |            |
|----|-------------|---|--------|------------|
| CN | 111408856 A |   | 7/2020 |            |
| CN | 109358036 B | * | 3/2021 | G01N 21/718 |

OTHER PUBLICATIONS

Jarnac et al. "Study of laser induced plasma grating dynamics in gases", Optics Communications 312 (2014); pp. 35-42.*
(Continued)

*Primary Examiner* — Mohamed K Amara
(74) *Attorney, Agent, or Firm* — Hodgson Russ LLP

(57) ABSTRACT

A multipulse-induced spectroscopy method based on a femtosecond plasma grating includes: pre-exciting a sample on a stage by providing a femtosecond pulse to form the femtosecond plasma grating; providing a post-pulse on the (Continued)

sample at an angle to excite the sample to generate a plasma, wherein the post-pulse comprises one or more femtosecond pulses, there is a time interval between the femtosecond pulse and the post-pulse, and the time interval is less than a lifetime of the femtosecond plasma grating; and receiving and analyzing a fluorescence emitted from the plasma to determine element information of the sample.

14 Claims, 3 Drawing Sheets

(56) References Cited

U.S. PATENT DOCUMENTS

| | | | |
|---|---|---|---|
| 11,247,295 B1* | 2/2022 | Bol'shakov | G01N 21/718 |
| 11,561,134 B2* | 1/2023 | Wang | H03M 7/3066 |
| 11,792,381 B2* | 10/2023 | Wang | G01S 17/894 |
| | | | 348/162 |
| 11,835,464 B1* | 12/2023 | Bol'shakov | G01J 3/443 |
| 12,123,836 B2* | 10/2024 | Zeng | G01N 21/718 |
| 2007/0019701 A1* | 1/2007 | Sherstobitov | H01S 3/0818 |
| | | | 372/55 |
| 2009/0081512 A1* | 3/2009 | Blanchard | H01M 8/122 |
| | | | 429/425 |
| 2010/0118900 A1* | 5/2010 | Waarts | H01S 3/0057 |
| | | | 372/25 |
| 2012/0099103 A1* | 4/2012 | Hahn | G01N 21/718 |
| | | | 356/316 |
| 2012/0314214 A1 | 12/2012 | Alexander et al. | |
| 2013/0278930 A1* | 10/2013 | Liu | G01N 21/718 |
| | | | 356/318 |
| 2020/0028316 A1* | 1/2020 | Hideur | H01S 3/094003 |
| 2023/0094973 A1* | 3/2023 | Zeng | G01N 21/718 |
| | | | 250/459.1 |
| 2023/0152236 A1* | 5/2023 | Yoo | H01J 49/0004 |
| | | | 356/318 |
| 2023/0358684 A1* | 11/2023 | Demarco | G01N 21/718 |

OTHER PUBLICATIONS

Mengyun Hu, et al. "Plasma-grating-induced breakdown spectroscopy" Adv. Optics , Nov./Dec. 2020 vol. 2 (6) pp. 1-5.*

Giannakaris et al. "Femtosecond Single-Pulse and Orthogonal Double-Pulse Laser-Induced Breakdown Spectroscopy (LIBS): Femtogram Mass Detection and Chemical Imaging with Micrometer Spatial Resolution"; App. Spectr. vol. 76(8)( 926-936 (2022). First published Sep. 8, 2021.*

Bergevin et al.; "Dual-comb spectroscopy of laser-induced plasmas", Nat. Commun. Mar. 28, 2018; 9: 1273 (Year: 2018).*

CNIPA, Office Action issued for CN Application No. 202111159827. 3, Nov. 15, 2023.

* cited by examiner

MULTIPULSE-INDUCED SPECTROSCOPY METHOD AND DEVICE BASED ON FEMTOSECOND PLASMA GRATING

CROSS-REFERENCE TO RELATED APPLICATION

This application claims priority to Chinese Patent Application Serial No. 202111159827.3, filed on Sep. 30, 2021, the entire disclosure of which is incorporated herein by reference.

FIELD

The present disclosure relates to a technical field of spectral detection, and specifically relates to a multipulse-induced spectroscopy method and device based on a femtosecond plasma grating.

BACKGROUND

Laser-induced breakdown spectroscopy (LIBS) is an elemental composition analysis technique used in elemental detection for samples of different applications. With the LIBS, a high-energy and short-pulse-width laser pulse is used as an excitation source and is focused on a sample. A normal double-pulse laser-induced spectroscopy uses a first pulse to pre-ablate a sample, and uses a second pulse to excite the sample to generate plasmas. By detecting and analyzing characteristic spectra of the plasmas, elemental composition and element concentration of the sample can be determined. A nanosecond pulse, a picosecond pulse, and a femtosecond pulse may be combined. The femtosecond pulse with a shorter pulse width may be used to excite the sample and the nanosecond pulse with a longer pulse width may be used to heat the generated plasma.

Although the nanosecond pulse has a good heating effect, the plasma generated by the excited sample will have a strong background spectral line in the early stage, which is not conducive to analysis. An optical filament formed by focusing the femtosecond pulse has a power clamping effect. In addition, two lasers are required to provide the two kinds of pulses, resulting in high cost and complex device structure.

SUMMARY

Embodiments of the present disclosure seek to solve at least one of the problems existing in the related art to at least some extent.

In a first aspect of the present disclosure, a multipulse-induced spectroscopy method based on a femtosecond plasma grating includes: pre-exciting a sample on a stage by providing a femtosecond pulse to form the femtosecond plasma grating; providing a post-pulse on the sample at an angle to excite the sample to generate a plasma, in which the post-pulse includes one or more femtosecond pulses, there is a time interval between the femtosecond pulse and the post-pulse, and the time interval is less than a lifetime of the femtosecond plasma grating; and receiving and analyzing a fluorescence emitted from the plasma to determine element information of the sample.

In some embodiments, the femtosecond plasma grating has a one-dimensional or multi-dimensional grating structure.

In some embodiments, the femtosecond plasma grating is formed by: splitting the femtosecond pulse into at least two femtosecond sub-pulses by a beam splitter; and synchronizing the sub-pulses in a time domain and focusing the sub-pulses at an intersection in space.

In some embodiments, synchronizing the sub-pulses in a time domain includes: providing a stepper motor in an optical path of a first sub-pulse, wherein the stepper motor is equipped with at least one reflector to allow the first sub-pulse to be reflected on it; and adjusting a position of the stepper motor to adjust the optical path of the first sub-pulse to allow the first sub-pulse to reach the intersection simultaneously with a second sub-pulse.

In some embodiments, the femtosecond plasma grating is formed by: splitting the femtosecond pulse into at least two femtosecond sub-pulses by an array lens; and focusing the sub-pulses at an intersection.

In some embodiments, the post-pulse is a pulse combination selected from a picosecond pulse combination and a femtosecond pulse combination, and there is a time interval between two adjacent pulses in the pulse combination.

In some embodiments, the sample is excited in a two-color field formed by coupling a double-frequency light of the post-pulse and the femtosecond plasma grating.

In some embodiments, the angle is a first-order or high-order Bragg angle.

In some embodiments, the sample is excited in a gas atmosphere of argon or neon, and the gas atmosphere has a gas flow rate of 2 to 10 L/min.

In some embodiments, the multipulse-induced spectroscopy method further includes moving the stage to allow different parts of the sample to be excited.

In some embodiments, the femtosecond laser pulse has a wavelength of 800 nm, a repetition frequency of 1000 Hz, and a pulse width of 50 fs.

In a second aspect of the present disclosure, a multipulse-induced spectroscopy device based on a femtosecond plasma grating includes: a femtosecond laser configured to generate a femtosecond laser pulse; a beam splitting unit configured to split the femtosecond laser pulse into three sub-pulses; a focusing unit configured to focus the three sub-pulses and allow focused sub-pulses to be overlapped at an intersection in space; a time domain synchronization unit configured to adjust an optical path of each of the three sub-pulses in such a way that two of the three sub-pulses have an optical path with a first length and arrive at the intersection in space simultaneously to form the femtosecond plasma grating, and the other one of the three sub-pulses has an optical path with a second length being different from the first length and arrives at the intersection in space after a preset time interval; a stage for supporting a sample; and a spectrum collection unit configured to collect a spectrum signal emitted by sample excitation.

In some embodiments, the multipulse-induced spectroscopy device further includes a polarization adjustment unit configured to adjust the polarization direction of each sub-pulse.

In some embodiments, the stage is an electronically controlled displacement stage composed of a stepper motor and a stage body, and is configured to move the sample to allow different regions of the sample to be excited.

In some embodiments, the time domain synchronization unit includes two time delay lines each provided with a stepper motor equipped with at least two reflectors.

In some embodiments, the beam splitting unit includes: a first beam splitter configured to split the femtosecond laser pulse into two primary pulses; and a second beam splitter configured to split one of the primary pulses into two secondary pulses.

In some embodiments, the spectrum collection unit includes: a lens configured to converge fluorescence emitted from the sample; an optical fiber probe configured to collect a fluorescence signal; and a spectrometer configured to receive and analyze the fluorescence signal transmitted from the optical fiber probe.

In some embodiments, the spectrometer is an Echelle grating spectrometer coupled with an intensified charge-coupled device and applied in an integrate-on-chip mode.

Figure 1:
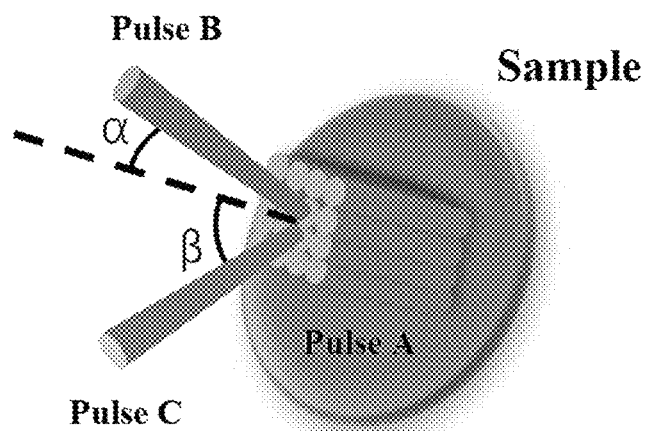
FIG. 1 is a schematic diagram showing a multipulse-induced spectroscopy method based on a femtosecond plasma grating according to an embodiment of the present disclosure.

REFERENCE NUMERALS (1) femtosecond laser; (2) electronically controlled shutter; (3) beam splitter A; (4) reflector A; (5) reflector B; (6) stepper motor A; (7) reflector C; (8) beam splitter B; (9) reflector D; (10) reflector E; (11) reflector F; (12) reflector G; (13) stepper motor B; (14) reflector H; (15) reflector I; (16) reflector J; (17) lens A; (18) lens B; (19) lens C; (20) three-dimensional displacement stage; (21) lens D; (22) lens E; (23) spectrometer; (24) photoelectric detector; (25) lens F; (26) lens G; (27) CCD camera.

DETAILED DESCRIPTION

Embodiments of the present disclosure are described in detail below, examples of which are illustrated in the drawings. The same or similar elements are denoted by the same reference numerals in different drawings unless indicated otherwise. The embodiments described herein with reference to drawings are explanatory, and used to generally understand the present disclosure. The embodiments shall not be construed to limit the present disclosure.

Embodiments of the present disclosure seek to solve at least one of the problems existing in the related art to at least some extent. The present disclosure provides a multipulse-induced spectroscopy method and device based on a femtosecond plasma grating, which introduces the plasma grating into a double-pulse laser-induced spectroscopy method. The femtosecond plasma grating has a high optical power density and electron density, and the signal-to-noise ratio of the present method and device can be improved.

In some embodiments, the multipulse-induced spectroscopy method based on the femtosecond plasma grating of the present disclosure includes the following operations.

In operation (1), a sample is pre-excited with a femtosecond plasma grating.

In operation (2), after a time interval, a post-pulse including a plurality of pulses is radiated on a surface of the sample with a spatial angle relative to the femtosecond plasma grating.

In operation (3), the femtosecond plasma grating is coupled with the post-pulse, and the sample to be tested is excited to generate a plasma group; and In operation (4), a fluorescence spectrum of the plasma group formed in operation (3) is detected and analyzed to acquire element information of the sample.

The femtosecond plasma grating in operation (1) may be formed by interaction of at least two synchronous femtosecond filaments, or may be obtained by focusing a single femtosecond laser pulse with an array lens. The femtosecond plasma grating may have a one-dimensional or multi-dimensional grating structure.

In operation (2), the time interval (also called a pulse delay) is less than a lifetime of the femtosecond plasma grating. In this way, the post-pulse reaches the surface of the sample before the plasma grating disappears, and the post-pulse can be coupled with the plasma grating to excite the sample. The setting of the delay can be based on an optical path delay. For example, two lasers generate two pulses at the same time, and the interval/delay between the two pulses can be adjusted by changing an optical path difference between the pulses. For another example, a delay pulse generator can be used to generate a trigger signal, so that two lasers can generate pulses with an interval, and the interval can be adjusted by setting the delay pulse generator.

The post-pulse may be composed of one or more pulses, and is a pulse combination which may be one or more selected from a picosecond pulse combination, a femtosecond filament combination, and a plasma grating. In addition, a two-color field may be formed by a double-frequency light and the femtosecond plasma grating, to improve excitation of the sample.

In some embodiments, the spatial angle in operation (2) may be a first-order or high-order Bragg angle, and adjusted to improve the coupling effect between the post-pulse and the femtosecond plasma grating.

In some embodiments, argon or neon is used as a gas atmosphere, and the gas atmosphere may has a gas flow rate of 2 to 10 L/min. The auxiliary gas may be ionized by multi-photons to induce high-density electrons, which effectively increases the electron density in the plasma grating, enhances spectral signal intensity, and improves detection sensitivity.

In the present method, the femtosecond plasma grating is applied to avoid the power clamp effect, and thus the optical power density and the electron density inside the plasma channel are improved. In addition, the post-pulse is incident on the sample through the plasma grating during the existence of the plasma grating, and thus is modulated by the plasma grating structure to achieve the coupling effect, resulting in further improvement of the electron density and the power density in the plasma channel. In this way, not only common solids, liquids or gases can be excited, but also materials that are difficult to be laser ablated, such as superhard materials, superstable oxides and ceramic materials can be excited, thereby improving the spectrum signals and the detection sensitivity. Further, a channel length of the plasma grating can be increased by the coupling modulation, thereby reducing the influence of the unevenness of the sample surface on signal acquisition and reducing signal fluctuation. In addition, the application of the femtosecond or picosecond pulse can effectively eliminate the plasma shielding effect and effectively overcome the matrix effect.

In another aspect, a double-pulse enhanced laser-induced breakdown spectroscopy device based on a femtosecond plasma grating is provided, which can simplify a double-pulse laser-induced spectroscopy device, improve portability, and reduce the device cost. The double-pulse excitation based on the femtosecond plasma grating is realized by beam splitting and optical path delay.

The double-pulse-induced breakdown spectroscopy device based on the femtosecond plasma grating includes a femtosecond laser, a beam splitting unit, a time-domain synchronization unit, a focusing unit, and a spectrum collection unit. A process for implementing the present spectroscopy method may include the following operations.

The femtosecond laser generates one femtosecond laser pulse and the pulse is split into three pulses, i.e., a first pulse, a second pulse and a third pulse by the beam splitting unit.

The first and third pulses pass through the time domain synchronization unit in optical paths having the same length and thus are synchronized in the time domain. The second pulse passes through the time domain synchronization unit in an optical path with a different length.

The three femtosecond laser beams pass through the focusing unit to form respective filaments. The filaments corresponding to the first and third pulses are overlapped in space and interacted at an overlapping region to form a femtosecond plasma grating with a periodic modulation structure. After the formation of the femtosecond plasma grating, the sample is excited. The second pulse is separately focused to form a filament coupled with the formed femtosecond plasma grating, and the sample is excited to form a plasma group.

Finally, the spectrum collection unit collects and analyzes spectrum signal formed by plasma radiation, to obtain information such as element composition and element concentration of the sample.

In some embodiments, there is an angle between an incident direction of the second pulse and the formed femtosecond plasma grating. The angle is a first-order or high-order Bragg angle.

In some embodiments, a polarization state of each of the first, second and third pulses is changed independently, to improve coupling between the excitation pulse and the sample.

In some embodiments, a time interval between the second pulse and the first/third pulse is adjustable. The present device adjusts the pulse delay by adjusting the optical path difference between the second pulse and the first/third pulse.

In some embodiments, an imaging system is set up to observe a relative position of the sample. The sample is kept in a region corresponding to the plasma grating.

In some embodiments, in the spectrum acquisition unit, a spectrometer coupled with an intensified charge-coupled device (ICCD) camera is used to analyze the collected signals, and a time delay and a gate width for spectrum acquisition are adjustable.

Due to the ultra-short pulse width of the femtosecond pulse, it has no acceleration effect on the plasma generated by the subsequent excitation of the sample, so there is no strong background in the early stage of the spectrum, and there is no need to set an acquisition delay. Considering a difference between a transmission speed of the triggering electrical signal and a propagation speed of light, an acquisition delay of the ICCD camera is set in a range between 100 ps and 5 ns. The acquisition gate width is determined by the plasma lifetime, and the acquisition time of the ICCD camera is set in a range of 100 to 500 ns In some embodiments, the spectrometer adopts an integrate-on-chip mode. Dozens, hundreds or even thousands of plasma-grating-based spectra are effectively accumulated in one exposure time of the CCD, and thus the signal intensity and the signal-to-noise ratio are improved.

With the present device, the excitation based on a combination of the femtosecond plasma grating and the femtosecond optical filament is realized with a simple optical path design. Compared with combination of the femtosecond filament and the nanosecond pulse, the combination of the femtosecond plasma grating and the femtosecond filament can be realized with only one femtosecond laser, which reduces the device cost and simplifies the device structure. Compared with the combination of one femtosecond filament and another femtosecond filament, the present disclosure achieves higher power density and electron density due to the femtosecond plasma grating, thus enhancing the intensity of the spectrum signals. In addition, the present device adopts the femtosecond pulse with a short pulse width to excite the sample, which can effectively overcome the common plasma shielding effect and matrix effect in traditional laser-induced breakdown spectroscopy. Therefore, the present method and device can achieve real-time accurate detection in various applications, such as deep-sea detection and industrial waste gas/liquid detection.

The present disclosure is further described with reference to the drawings.

FIG. 1 is a schematic diagram showing a multipulse-induced spectroscopy method based on a femtosecond plasma grating according to an embodiment of the present disclosure. As shown in FIG. 1, Pulse A is used to form a one-dimensional or multi-dimensional femtosecond plasma grating for sample excitation. Pulse B and Pulse C are incident on a sample surface as a post-pulse after a time interval. For example, the post-pulse is composed of more than one pulse, which may be selected from a femtosecond pulse, a picosecond pulse and a femtosecond plasma grating. A double-frequency light can be used to form a two-color field to excite the sample. An angle between an incident direction of the post-pulse (i.e., Pulse B and Pulse C) and the femtosecond plasma grating is α and β, respectively, and the angle α and β may be a first-order or high-order Bragg angle. After the post-pulse is coupled with the plasma grating, the power density and the electron density inside the plasma grating channel are improved, and the length of the plasma channel is increased, thereby effectively improving the detection sensitivity and stability.

Figure 2:
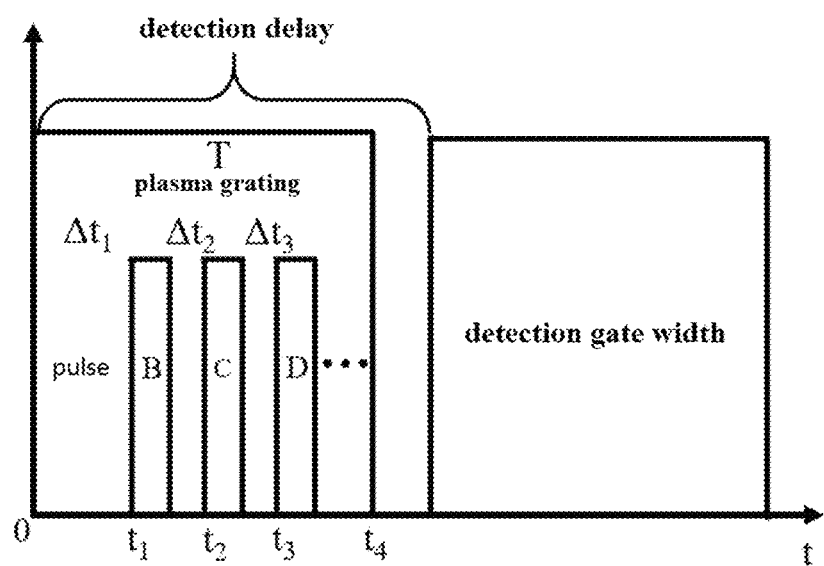
FIG. 2 is a schematic diagram of a multipulse timing sequence according to an embodiment of the present disclosure.

A delay (i.e., an interval) can be set between the pulses of the post-pulse. FIG. 2 is a schematic diagram of a multipulse timing sequence. The timing starts after pulse A is incident, and a plasma grating structure with a lifetime T is formed immediately. The structure lasts until a time t4. After an interval Δt1, Pulse B is incident for the excitation at time t1. Pulse C is incident at a time t2, and an interval Δt2 is between Pulse B and Pulse C. Pulse D is incident at a time t3, and an interval Δt3 is between Pulse C and Pulse D, and so on. By setting a detection delay, spectrum acquisition can be performed after the plasma grating disappears. The delay and the gate width may be adjusted in practice.

The time interval between the pulses is in the order of picoseconds to nanoseconds, which can be adjusted by changing an optical path traveled by the pulse. If an optical path difference between two pulses is ΔL, a time interval is Δt=ΔL/c, where c is a speed of light.

Figure 3:
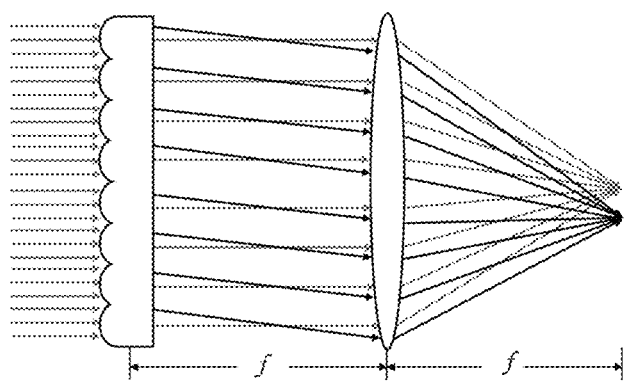
FIG. 3 is a schematic diagram of an array lens according to an embodiment of the present disclosure.

One way of forming the femtosecond plasma grating is based on an array lens. FIG. 3 shows an example of the array lens. The array lens is composed of sub-lenses with a diameter of several hundred nanometers to several millimeters in a certain order on a substrate. Each sub-lens has a unique optical axis, and the entire array of lenses as a whole has a main optical axis. Optical signals can be transmitted independently without interfering with each other. When a femtosecond laser is incident, the array lens splits the incident beam into many small units, and the energy of each unit can be approximately regarded as uniformly distributed. A common focusing lens can be provided after the array lens, and they are coordinated to form the grating periodic structure.

Figure 4:
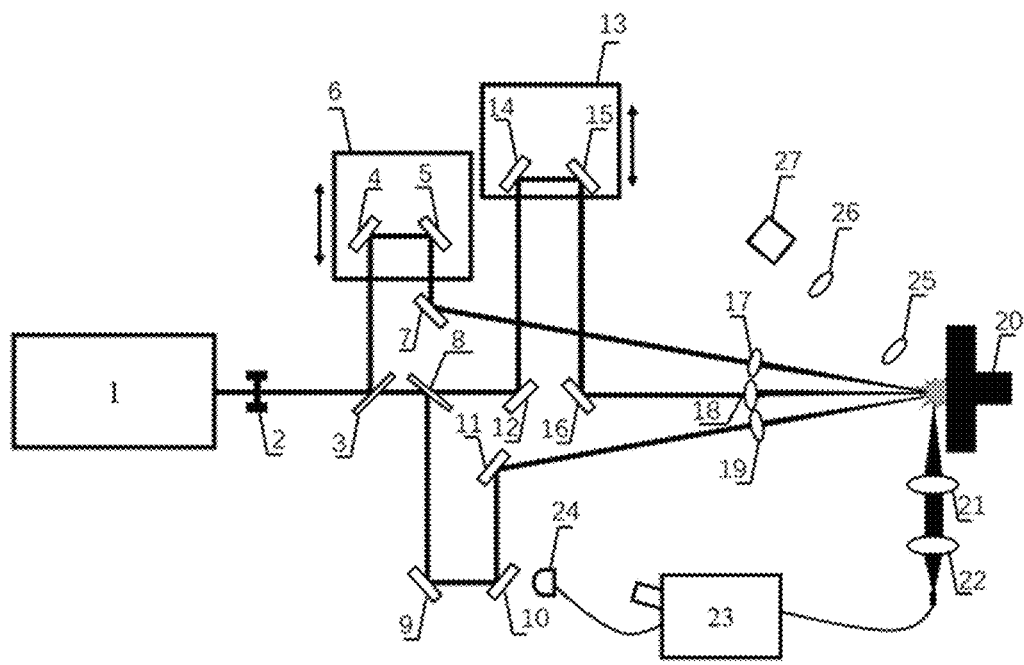
FIG. 4 is a schematic diagram of a multipulse-induced spectroscopy device based on a femtosecond plasma grating according to an embodiment of the present disclosure.

Another way of forming the femtosecond plasma grating is based on beam splitting and synchronizing split pulses. The femtosecond plasma grating is formed by the interaction of more than one femtosecond laser beam. FIG. 4 is a schematic diagram of a multipulse-induced spectroscopy device based on a femtosecond plasma grating. As shown in FIG. 4, a femtosecond laser (1) produces a laser pulse with a wavelength of 800 nm, a repetition rate of 1 kHz, and a pulse width of 50 fs. The pulse is split by a beam splitter A (3) into a primary transmission light and a primary reflection light (i.e., a first pulse), and the primary transmission light is further split by a beam splitter B (8) into a secondary transmission light (i.e., a second pulse) and a secondary reflection light (i.e., a third pulse). The first pulse passes through a first delay line (composed of reflectors A to C (4, 5, 7) and a stepper motor A (6)), and is converged by a lens A (17). The second pulse passes through a second delay line (composed of reflectors G to J (12, 14, 15, 16) and a stepper motor B (13)), and is converged by a lens B (18). The third pulse reaches reflectors D to F (9, 10, 11) and is converged by a lens C (19). The three pulses are overlapped at or near a focal point (the lenses have an approximately identical focal point). The stepper motor A (6) is controlled to make lengths of optical paths of the first and third pulses equal (to achieve time domain synchronization), forming the plasma grating for the sample excitation. The stepper motor B is controlled to make the second pulse incident on the sample after a preset delay, and thus the second pulse is coupled with the plasma grating to excite the sample, and plasmas emitted from the sample excitation are formed.

A fluorescence emitted by the plasma is converged by lenses D and E (21, 22), is collected by an optical fiber probe, and is transmitted into a spectrometer (23) through optical fiber for analysis. A trigger signal that the spectrometer (23) starts to collect the fluorescence is generated by a photoelectric detector (24).

The present device adopts an Echelle grating spectrometer coupled with an ICCD camera, which is configured to adjust the acquisition delay and acquisition gate width, thus improving the signal-to-noise ratio of the spectrum and achieving precise analysis. Due to the ultra-short pulse width of the femtosecond laser, it will not have too much interaction with the plasma emitted from the sample excitation, there will not be a strong background line in the early stage, and thus the spectrum of the radiated plasma throughout its lifetime can be acquired precisely for analysis. The detection delay may be determined according to a propagation time of the light, an electrical propagation time and a duration of the plasma grating. For example, the detection delay is about 5 ns. The gate width of the detection may be determined according to the lifetime of the plasma. For example, the gate width of the detection is between 100 to 500 ns.

In some embodiments, the acquisition mode of the spectrometer is selected as an integrate-on-chip mode. In this mode, the ICCD can accumulate more than one spectrum signal within one exposure time, which can improve the signal-to-noise ratio of the spectral line. If the exposure time is set to 0.1 s, 100 pulse excitation spectrum signals can be collected.

Figure 5:
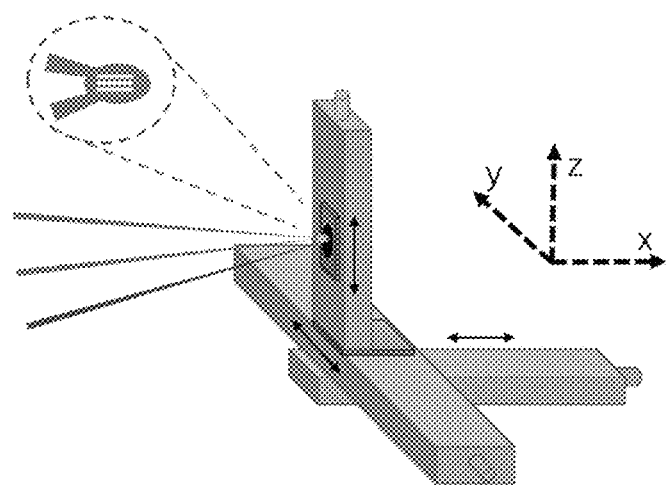
FIG. 5 is a schematic diagram of a three-dimensional displacement stage according to an embodiment of the present disclosure.

When exciting a solid sample, in order to obtain a stable spectral signal, after a first point on the surface of the sample is excited, the sample is moved to allow a new point on the surface to be excited. This can be realized through a timing control of a mechanical shutter and a three-dimensional displacement stage. As shown in FIG. 5, the three-dimensional displacement stage includes three stepper motors. When the device is operating, it first accelerates the motor of the Z axis to about 40 mm/s, and maintains a uniform linear motion. At this time, the photoelectric shutter is opened, and a femtosecond laser passes through the shutter and successfully reaches the sample surface. After one pulse excitation is completed, the motor moves to a next point to allow a new point on the sample surface to be excited. A repetition frequency of the femtosecond laser is 1000 Hz, that is, the femtosecond laser generates a laser pulse every 0.001 s, so an interval between two adjacent points is about 40 μm.

Figure 6:
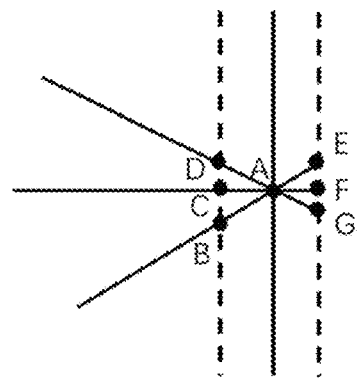
FIG. 6 is a schematic diagram of an imaging observation system according to an embodiment of the present disclosure.

Since the plasma grating has a certain length, it reduces the requirement for front and rear positions of the sample surface. The sample to be excited still should be within the plasma grating. Therefore, the device of the present disclosure is provided with lenses F and G (25, 26) to form an imaging system to observe the front and rear positions of the sample to obtain quantitative analysis results. A specific implementation scheme is shown in FIG. 6. An indication laser beam is split into three beams. The three beams pass through their respective optical path with the same length and are incident on the surface of the sample to generate light spot(s) for observable. The light spot is captured via the imaging system composed of the CCD, the lens F and the lens G. Whether the sample is within the plasma grating can be determined by observing the coincidence of position(s) of the light spot(s) corresponding to the three beams. If three spots B, C, and D (or E, F, and G) are observed in the CCD image, it indicates that the sample deviates from the plasma grating. If only one spot A is observed in the CCD image, it indicates that the sample is within the plasma grating. Accuracy of such an observation system is related to focal lengths of the lens F and the lens G. For example, the focal length of the lens F is 10 cm, and the focal length of the lens G is 5 cm. The system can observe the front and rear position changes of the sample with an accuracy of 0.01 mm, which is much smaller than the length of the plasma grating channel, thus meeting the requirements of detecting and controlling the relative position of the sample surface.

Figure 7A:
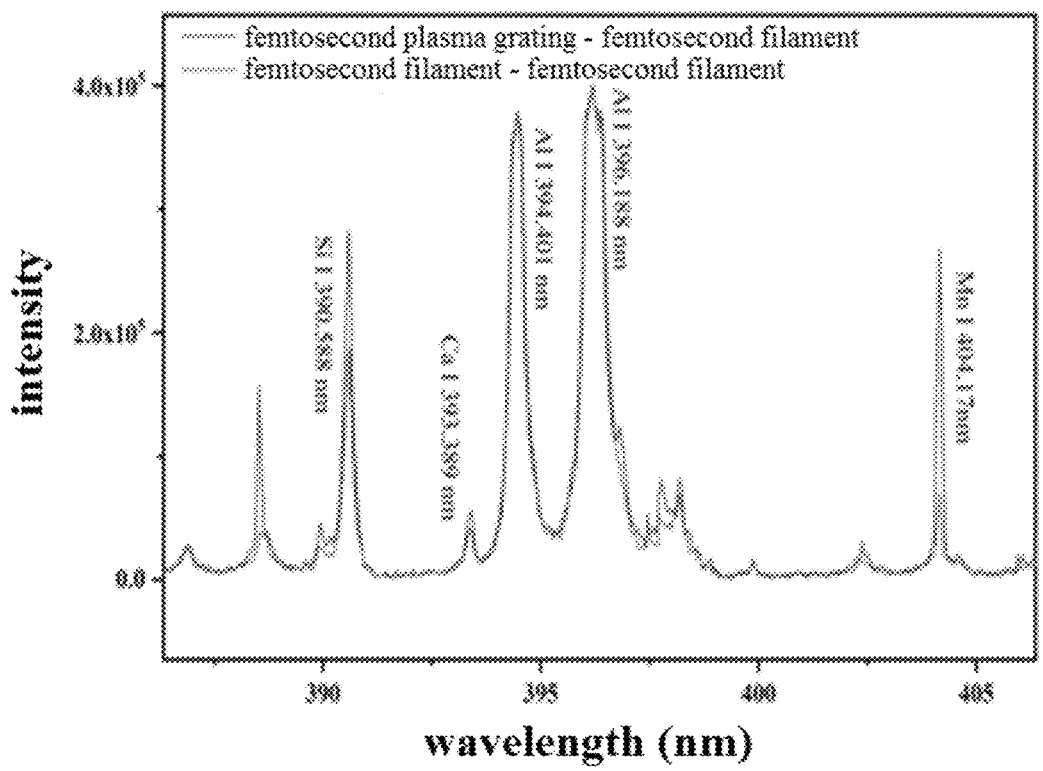
FIG. 7A is a graph showing a spectrum acquired by spectroscopy based on a femtosecond plasma grating and a femtosecond filament, and a spectrum acquired by spectroscopy based on two femtosecond filaments.
Figure 7B:
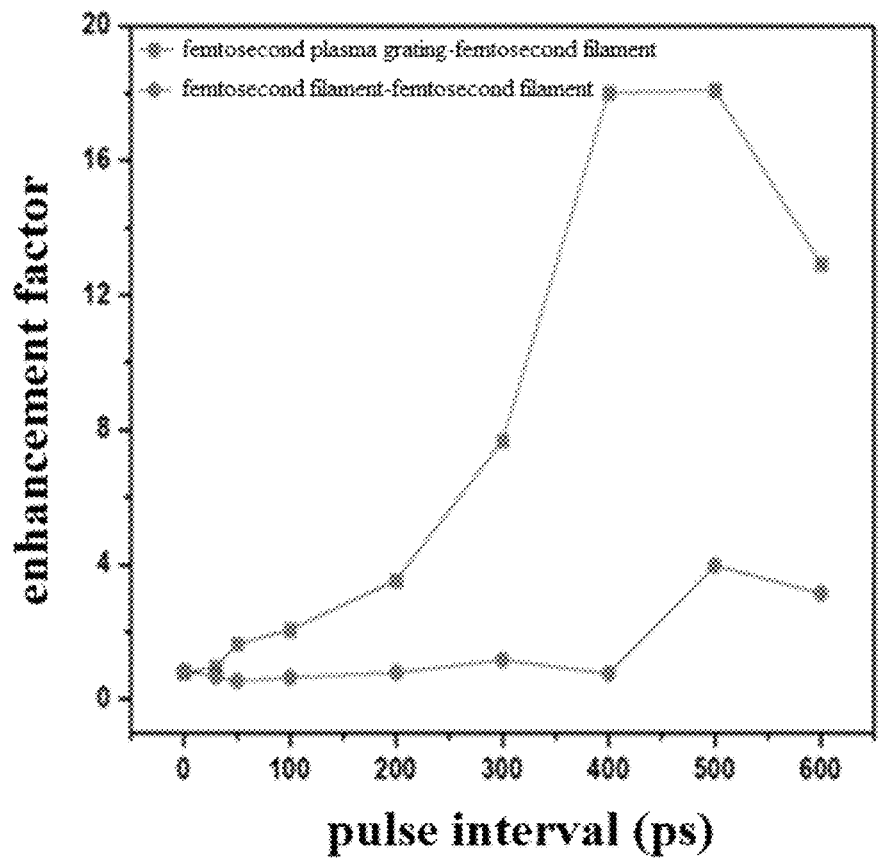
FIG. 7B is a graph showing intensity enhancements as a pulse interval changes for spectrums acquired by spectroscopy based on a femtosecond plasma grating and a femtosecond filament and spectroscopy based on two femtosecond filaments.

FIG. 7A is a graph showing a spectrum acquired by spectroscopy based on a femtosecond plasma grating and a femtosecond filament, and a spectrum acquired by spectroscopy based on two femtosecond filaments, and FIG. 7B is a graph showing intensity enhancements as a pulse interval changes for spectrums acquired by spectroscopy based on a femtosecond plasma grating and a femtosecond filament and spectroscopy based on two femtosecond filaments.

In this example, the same soil sample is used, the femtosecond laser power is 0.88 W, the spectrum acquisition delay is 5 ns, and the acquisition gate width is 200 ns. The comparison result is shown in FIG. 7A, for elements that are easily excited, spectrums (such as Al at 395.108 nm and 396.188 nm) acquired by the different spectroscopy are saturated, and the excitation effects are similar. However, for elements that are difficult to be excited, spectrums (such as Mn at 404.147 nm) are significantly different. The spectrum acquired from the spectroscopy method based on the combination of the femtosecond plasma grating and the femtosecond filament according to the present disclosure has a higher intensity.

The spectrums for Mn at 404.147 nm is used as an example to compare the two excitation solutions, and a result is shown in FIG. 7B. In this graph, the ordinate represents an enhancement factor of one of two spectrums acquired by the two excitation solutions relative to a spectrum acquired by spectroscopy based on a single filament under the same laser energy. The result shows that the enhancement effect is related to the pulse interval. When the pulse interval is less than 30 ps, the enhancement factor of the spectrum acquired by the spectroscopy based on the combination of the femtosecond plasma grating and the femtosecond filament is similar to the enhancement factor of the spectrum acquired by the spectroscopy based on the combination of one femtosecond filament and another femtosecond filament (i.e., two femtosecond filaments). As the pulse interval increases, the enhancement factor of the spectrum acquired by the spectroscopy based on the combination of the femtosecond plasma grating and the femtosecond filament is increased significantly and is higher than the enhancement factor of the spectrum acquired by the spectroscopy based on the two femtosecond filaments. The growth becomes slow after the pulse interval reaches 400 ps, but still, the combination of the femtosecond plasma grating and the femtosecond filament provided by the present disclosure shows a better excitation effect.

In addition, terms such as "first" and "second" are used herein for purposes of description and are not intended to indicate or imply relative importance or significance or to imply the number of indicated technical features. Thus, the feature defined with "first" and "second" may include one or more of this feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from the scope of the present disclosure.

What is claimed is:

1. A multipulse-induced spectroscopy method based on a femtosecond plasma grating, comprising:
   pre-exciting a sample on a stage by providing a femtosecond pulse to form the femtosecond plasma grating;
   providing a post-pulse on the sample at an angle to excite the sample to generate a plasma, wherein the post-pulse comprises one or more femtosecond pulses, there is a time interval between the femtosecond pulse and the post-pulse, and the time interval is less than a lifetime of the femtosecond plasma grating; and
   receiving and analyzing a fluorescence emitted from the plasma to determine element information of the sample;
   wherein the method further comprises:
      splitting the femtosecond pulse into three sub-pulses; and
      adjusting an optical path of each of the three sub-pulses in such a way that a first pulse and a third pulse of the three sub-pulses have an optical path with a first length and arrive at the intersection in space simultaneously to form the femtosecond plasma grating, and a second pulse of the three sub-pulses has an optical path with a second length being different from the first length and arrives at the intersection in space after a preset time interval;
   wherein splitting the femtosecond pulse into three sub-pulses comprises:
      splitting the femtosecond pulse into the first pulse and a primary reflection light; and
      splitting the primary reflection light into the second pulse and the third pulse.

2. The multipulse-induced spectroscopy method according to claim 1, wherein the femtosecond plasma grating has a one-dimensional or multi-dimensional grating structure.

3. The multipulse-induced spectroscopy method according to claim 1, wherein the post-pulse is a pulse combination selected from a picosecond pulse combination and a femtosecond pulse combination, and there is a time interval between two adjacent pulses in the pulse combination.

4. The multipulse-induced spectroscopy method according to claim 1, wherein the sample is excited in a two-color field formed by coupling a double-frequency light of the post-pulse and the femtosecond plasma grating.

5. The multipulse-induced spectroscopy method according to claim 1, wherein the angle is a first-order or high-order Bragg angle.

6. The multipulse-induced spectroscopy method according to claim 1, wherein the sample is excited in a gas atmosphere of argon or neon, and the gas atmosphere has a gas flow rate of 2 to 10 L/min.

7. The multipulse-induced spectroscopy method according to claim 1, further comprising:
   moving the stage to allow different parts of the sample to be excited.

8. The multipulse-induced spectroscopy method according to claim 1, wherein the femtosecond pulse has a wavelength of 800 nm, a repetition frequency of 1000 Hz, and a pulse width of 50 fs.

9. A multipulse-induced spectroscopy device based on a femtosecond plasma grating, comprising:
   a femtosecond laser configured to generate a femtosecond laser pulse;
   a beam splitting component configured to split the femtosecond laser pulse into three sub-pulses;
   a focusing component configured to focus the three sub-pulses to allow focused sub-pulses to be overlapped at an intersection in space;

a time domain synchronization component configured to adjust an optical path of each of the three sub-pulses in such a way that a first pulse and a third pulse of the three sub-pulses have an optical path with a first length and arrive at the intersection in space simultaneously to form the femtosecond plasma grating, and a second pulse of the three sub-pulses has an optical path with a second length being different from the first length and arrives at the intersection in space after a preset time interval;

a stage for supporting a sample; and a spectrum collection component configured to collect a spectrum signal emitted by sample excitation, wherein the beam splitting component comprises:
    a first beam splitter configured to split the femtosecond laser pulse into the first pulse and a primary reflection light; and
    a second beam splitter configured to split the primary reflection light into the second pulse and the third pulse.

10. The multipulse-induced spectroscopy device according to claim 9, further comprising:
    a polarization adjustment component configured to adjust a polarization direction of each sub-pulse.

11. The multipulse-induced spectroscopy device according to claim 9, wherein the stage is an electronically controlled displacement stage composed of a stepper motor and a stage body, and is configured to move the sample to allow different regions of the sample to be excited.

12. The multipulse-induced spectroscopy device according to claim 9, wherein the time domain synchronization component comprises two time delay lines each provided with a stepper motor equipped with at least two reflectors.

13. The multipulse-induced spectroscopy device according to claim 9, wherein the spectrum collection component comprises:
    a lens configured to converge fluorescence emitted from the sample;
    an optical fiber probe configured to collect a fluorescence signal; and
    a spectrometer configured to receive and analyze the fluorescence signal transmitted from the optical fiber probe.

14. The multipulse-induced spectroscopy device according to claim 13, wherein the spectrometer is an Echelle grating spectrometer coupled with an intensified charge-coupled device and applied in an integrate-on-chip mode.

* * * * *